3,367,980
PREPARATION OF ALKYLIDENE BISPHENOLS
Edward F. Zaweski, Royal Oak, Mich., assignor to Ethyl Corporation, New York, N.Y., a corporation of Virginia
No Drawing. Filed July 15, 1965, Ser. No. 472,345
11 Claims. (Cl. 260—619)

This invention relates to an improved process for the preparation of alkylidene bisphenols.

It is known that alkylidene bisphenols can be prepared by the reaction of a phenol with a carbonyl compound in the presence of an acid or base catalyst. This reaction may also be carried out in a solvent as described in U.S. Patent 2,807,653. The rate of reaction when using certain phenols, especially alkylated phenols, however, is frequently quite slow, taking days to obtain any appreciable yield of the alkylidene bisphenol product. There is a need then for improving or increasing the reaction rate for this type preparation.

An object of this invention is to provide an improved process for the manufacture of alkylidene bisphenols. A further object of this invention is to provide a process for producing alkylidene bisphenols wherein the reaction rate is increased substantially. Other objects of this invention will be made clear in the detailed description and claims to follow.

These and other objects of this invention are accomplished by the reaction of a phenol having the formula

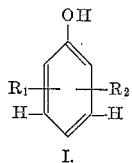

I.

with a carbonyl compound having the formula

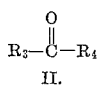

II.

wherein $R_1$, $R_2$, $R_3$ and $R_4$ are independently selected from the group consisting of hydrogen, alkyl radicals containing 1–12 carbon atoms, aryl radicals containing 6–12 carbon atoms, aralkyl radicals containing 7–12 carbon atoms and alkaryl radicals containing 7–12 carbon atoms, in the presence of a sulfoxide having the formula

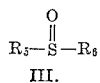

III.

The pictorial designation of $R_1$ and $R_2$ in Formula I indicates that $R_1$ and $R_2$ may be located on the benzene ring in the positions ortho and para to the hydroxyl group. Thus, $R_1$ and $R_2$ may both be ortho to the hydroxy group or one may be ortho and the other may be para to the hydroxy group.

A preferred embodiment of this invention is a process comprising the reaction of the phenol (Formula I) wherein $R_1$ and $R_2$ are selected from the group consisting of hydrogen, alkyl radicals containing 1–12 carbon atoms and alkaryl radicals containing 7–12 carbon atoms with a carbonyl compound (Formula II) wherein $R_3$ and $R_4$ are selected from the group consisting of alkyl radicals containing 1–12 carbon atoms, in the presence of a sulfoxide (Formula III) wherein $R_5$ and $R_6$ are alkyl radicals containing 1–8 carbon atoms.

A more preferred embodiment of this invention is a process comprising the reaction of a phenol (Formula I) wherein $R_1$ and $R_2$ are selected from the group consisting of hydrogen and alkyl radicals containing 1–12 carbon atoms with a carbonyl compound (Formula II) wherein $R_3$ and $R_4$ are alkyl radicals containing 1–12 carbon atoms in the presence of a sulfoxide (Formula III) wherein $R_5$ and $R_6$ are alkyl radicals containing 1–8 carbon atoms.

A highly preferred embodiment of this invention is a process comprising the reaction of a phenol having the formula:

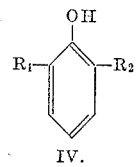

IV.

wherein $R_1$ is an α-branched alkyl radical containing 3–12 carbon atoms and $R_2$ is an alkyl radical containing 1–12 carbon atoms, with a carbonyl compound (Formula II), wherein $R_3$ and $R_4$ are alkyl radicals containing 1–12 carbon atoms, in the presence of a sulfoxide (Formula III), wherein $R_5$ and $R_6$ are alkyl radicals containing 1–8 carbon atoms.

The phenols useful in this process are organic compounds in which at least one hydroxyl group is attached directly to a carbon atom in a benzene ring and in which at least one reactive position, i.e., an ortho or para position, on the benzene ring is open, that is, bonded to hydrogen. Phenols which will react with a carbonyl compound to form a bisphenol product may be used in this process. This includes substituted phenols, that is, phenols in which one or more of the hydrogen atoms on the benzene nucleus have been replaced by another atom or group. Examples of phenols useful in the process include: o-ethylphenol; p-n-butylphenol; p-n-dodecylphenol; o-(2-ethyl-n-heptyl)phenol; p-isopropylphenol; o-n-hexylphenol; 2-methyl-6-n-dodecylphenol; 2-n-undecyl-6-n-pentylphenol; 2-n-hexyl-6-isopropylphenol; 2-n-butyl-4-n-dodecylphenol; 2-n-octyl-4-(1-methyl-n-heptyl)phenol; 2,6-diethylphenol; 2,4 - diundecylphenol; 2,6-di-(1-methyl-n-pentyl)phenol; 2-phenylphenol; 4-(4-biphenylyl)-phenol; 2-α-naphthylphenol; 2,4-dibenzylphenol; 2-(4-ethylphenyl) - 6 - (3 - phenyl-n-propyl)phenol; 2-n-propyl-4-(3-biphenylyl)phenol; 2-(4-phenyl-n-hexyl)-4-butylphenol; 2-methyl-4-chlorophenol; o-bromophenol; 2-n-heptyl-6-chlorophenol; 2-isobutyl - 4 - chlorophenol; 2-cyclohexyl-4-n-pentylphenol, and the like.

Mono- and di-substituted phenols in which alkyl groups containing from about 1–12 carbon atoms, or alkaryl groups containing from about 7 to about 12 carbon atoms, are the substituting groups, are preferred. The mono-substituted phenols are those in which only one phenolic benzene ring hydrogen is replaced by another group (or atom). Examples of these preferred mono-substituted phenols include: o-n-propylphenol; p-n-octylphenol; o-(1-methyl-n-butyl)phenol; p-n-decylphenol; o-n-heptylphenol; o-(2,2,3,3-tetramethyl)phenol; p-heptylphenol; p-6-phenyl-n-hexylphenol; o-benzylphenol; p-(2-phenyl-n-propyl)phenol; p-cresol; p-(α-methylbenzyl)phenol; o-(α,α-dimethylbenzyl)phenol and the like. Di-substituted phenols are those in which two benzene ring hydrogen atoms are replaced by other atoms or groups. Examples of some preferred di-substituted phenols are: 2,4-dimethylphenol; 2,6-di-n-heptylphenol; 2 - methyl-4-(4-phenyl-n-butyl)phenol; 2-phenethyl-6-(2-methyl-n-propyl)phenol; 2,4-di-(6-phenyl-n-hexyl)phenol; 2,6 - dibenzylphenol; 2-n-dodecyl-4-bromophenol; 2-(2,2-dimethylethyl) - 6 - chlorophenol; 2,6-(2 - methylbenzyl)phenol; 2-(2-methylbenzyl)-4-n-butylphenol and 2-n-pentyl-6-(α,α-dimethyl benzyl)phenol.

Substituted phenols which have at least one alkyl group in the ortho position are more preferred in carrying out this process. These are commonly called orthoalkylated phenols. Preferably, the alkyl group has from 1 to about 12 carbon atoms. The mono-orthoalkylated phenols have only one alkyl group in the ortho position. Some examples of the more preferred mono-orthoalkylated phenols include: o-cresol; o-isopropylphenol; o-isobutylphenol; o-n-decylphenol; o-n-hexylphenol; o-n-undecylphenol; o-n-nonylphenol; o-sec-butylphenol and the like.

Di-orthoalkylated phenols which are more preferred have alkyl groups in both positions ortho to the hydroxyl group. Examples of the more preferred phenols include: 2 - ethyl - 6 - n - dodecylphenol; 2 - n - pentyl - 6 - n-nonylphenol; 2 - methyl - 6 - (2 - ethyl - n - hexyl)phenol; 2,6 - di - n - propylphenol; 2,6 - di - (3 - methyl - n - undecyl)phenol; 2,6 - di - n - octylphenol; 2 - n - octyl - 6-n-decylphenol and the like.

The 2,6-di-substituted phenols (Formula IV), wherein at least one of the substituting groups is an α-branched alkyl radical, are highly preferred in this process. By α-branched alkyl radical is meant an alkyl radical which is attached directly to the benzene ring through a secondary or tertiary carbon atom. When phenols are substituted in the 2,6-position, they are often described as "hindered" phenols. The groups in the positions on the benzene ring adjacent to the hydroxyl group sterically hinder the hydroxyl group, thereby preventing easy access to this group by other chemical agents. The α-branched alkyl radicals are especially effective in their hindering action. Examples of these highly preferred phenols include: 2 - isopropyl - 6 - methylphenol; 2 - (1 - methyl-n - octyl) - 6 - hexylphenol; 2 - (1 - methyl - n - undecyl) - 6 - n - dodecylphenol; 2 - isobutyl - 6 - n - propylphenol; 2,6-di-sec-butylphenol and 2,6-diisopropylphenol.

A most preferred phenol is 2,6-di-tert-butylphenol.

The carbonyl compounds are organic compounds which contain the functional group

in the configuration as illustrated in Figure II. Any carbonyl compound which will react with a phenol to form an alkylidene bisphenol may be used in this process. These compounds include both aldehydes and ketones. The aldehydes have two hydrogen atoms or one hydrogen atom and one hydrocarbyl radical attached directly to the

functional group. Preferably, this hydrocarbyl radical should contain from 1 to 12 carbon atoms. It can be an aryl radical, a substituted aryl radical, an alkyl radical or a substituted alkyl radical. Examples of useful aldehydes are: formaldehyde, hexanal, dodecanal, benzaldehyde, 4-phenylbenzaldehyde, β-phenylpropionaldehyde, 2-methylbenzaldehyde, β-naphthylaldehyde, and the like.

Ketones have two hydrocarbyl radicals attached directly to the

functional group. In some cases, the hydrocarbyl radicals may be connected at their terminal ends to form cyclic ketones such as cyclohexanone. These hydrocarbyl radicals preferably contain from 1 to about 12 carbon atoms. These radicals may be aryl radicals, substituted aryl radicals, alkyl radicals and substituted alkyl radicals. Since there are two such radicals in the ketone structure, they may both be the same as for example in diethyl ketone or they may be different as for example in n-butyl phenyl ketone. Examples of useful ketones are: levulinic acid, methyl-n-dodecyl ketone, n-hexyl-n-decyl ketone, di-n-pentyl ketone, phenethyl-(4-biphenylyl) ketone, benzyl-(6-phenyl-n-hexyl) ketone, di(2-methyl-n-hexyl) ketone, n-dodecyl-(3-biphenylyl) ketone, dibenzyl ketone, ethyl-(3-phenyl-n-propyl) ketone, α-naphthyl methyl ketone, diphenyl ketone, benzophenone, isobutyl-n-hexyl ketone and the like.

The alkanals and the dialkyl ketones are preferred carbonyl compounds useful in this process. Alkanals are alkyl aldehydes. It is preferred that the alkyl radicals contain from 1 to about 12 carbon atoms. Examples of preferred aldehydes and ketones include: acetaldehyde, heptanal, decanal, methyl-n-hexyl ketone, diisopropyl ketone, di-(2-methyl-n-hexyl) ketone, n-hexyl-n- dodecyl ketone, and di-n-decyl ketone.

The more preferred carbonyl compounds which are useful in this process are the low molecular weight dialkyl ketones. The alkyl groups may be primary, secondary, or tertiary and contain from 1 to 4 carbon atoms. Examples of these ketones include: methyl ethyl ketone, diethyl ketone, methyl isobutyl ketone, diisobutyl ketone, ethyl-sec-butyl ketone, isopropyl n-butyl ketone, and di-n-propyl ketone.

A most preferred carbonyl compound is acetone.

The sulfoxides are illustrated by Formula III. Typically, they can be prepared by the oxidation of the corresponding sulfides. Commercially, some sulfoxides are recovered as by-products in the manufacture of paper. When a phenol/carbonyl compound condensation reaction is carried out in the presence of a sulfoxide, the rate of reaction and/or yield of the alkylidene bisphenol product are significantly increased. The sulfoxide therein acts as a promoter. Examples offered later will further illustrate this activity. Since the sulfoxide acts as a promoter, any sulfoxide or mixture of sulfoxides may be used in the process. The substituents $R_3$ and $R_4$ in Formula III may be any hydrocarbyl radicals with from 1 to about 12 carbon atoms. This includes both aryl and alkyl radicals. Examples of useful sulfoxides are methyl n-butyl sulfoxide; n-methyl n-octyl sulfoxide; di-n-pentyl sulfoxide; di-n-octyl sulfoxide; methyl phenyl sulfoxide; n-butyl α-naphthyl sulfoxide; isobutyl β-naphthyl sulfoxide; n-octyl (4-biphenylyl) sulfoxide; diphenyl sulfoxide; phenyl α-naphthyl sulfoxide; phenyl (3-biphenylyl) sulfoxide; α-naphthyl (4-biphenylyl) sulfoxide; diisopropyl sulfoxide and n-heptyl (2-ethyl-n-hexyl) sulfoxide.

In general, dialkyl sulfoxides are more preferred in this process. The dialkyl sulfoxides may be symmetrical or unsymmetrical. Symmetrical dialkyl sulfoxides will have identical alkyl groups bound to the sulfur atom. Examples of these symmetrical sulfoxides are: diethyl sulfoxide, di-n-butyl sulfoxide, diisopropyl sulfoxide, di-n-heptyl sulfoxide, di-(3-ethyl-n-pentyl) sulfoxide, and the like. Where different alkyl groups are bound to the sulfur atom, the dialkyl sulfoxides are termed unsymmetrical. Examples of these include: n-butyl-n-octyl sulfoxide, methyl isobutyl sulfoxide, n-pentyl n-hexyl sulfoxide, ethyl(2-methyl-n-heptyl) sulfoxide and the like.

A most preferred sulfoxide is dimethyl sulfoxide.

In carrying out the process of this invention, the ratio of phenol to carbonyl compound may be varied over a wide range. For example, the mole ratio of phenol to carbonyl compound may be varied from 10:1 to 1:10. A preferred mole ratio of the phenol to carbonyl compound is from 2:1 to 1:10. A most preferred mole ratio range of phenol to carbonyl compound is 2:1 to 1:2.

The sulfoxide as used in the invention acts as a promoter, as previously described. It is a requirement of the process of this invention that a sulfoxide or any mixture of sulfoxides be present with the phenol and carbonyl compound. Since the sulfoxide acts as a promoter, the quantity of sulfoxide present in the reaction mixture may be varied over a wide range. The sulfoxide may be present in quantities such that it might act as a solvent or reaction medium. The sulfoxide may be used together with other media in "solvent" quantities. These other media should be inert under the conditions of the condensation reaction. They should not prevent the sulfoxide from functioning as a promoter. Examples of such media include the alcohols such as isopropanol, ethanol and amyl alcohol; ethers such as dibutyl ether, dimethyl carbitol, dioxane and tetrahydrofuran; and hydrocarbons such as hexane, xylene and toluene.

It is to be understood that the condensation reaction can also be carried out without the use of a diverse reaction medium. In other words the process of this invention can be carried out in a reaction medium consisting essentially of a sulfoxide.

Regardless of the reaction system used, the sulfoxide must be present in at least promoter quantities. A promoter quantity is that amount of sulfoxide which will effect improvement in the rate and/or yield of the phenol/carbonyl compound condensation reaction. As little as 40 parts by weight of sulfoxide, per 100 parts by weight of reactant phenol is effective as a promoter. There is no critical upper limit in the amount of sulfoxide. The upper limit of sulfoxide which is used is determined for example by the dilution level which may be desired, reaction vessel size, or other similar factors. Amounts of sulfoxide as high as 2,000 parts by weight for every 100 parts by weight of reactant phenol may be used. Greater and lesser amounts of sulfoxide may be used provided that a promoter quantity is employed.

The presence of a small amount of an acidic or basic substance is known to catalyze the condensation of a phenol and a carbonyl compound. The use of a catalyst is generally preferred even where the sulfoxide is present and acts as a promoter. Since the catalyst remains unchanged after the reaction is complete and may be retained in the product as an impurity, it is desirable that the catalyst be soluble in water. Common acid catalysts used are the strong mineral acids such as sulphuric acid, phosphoric acid, hydrochloric acid, organic acids such as p-toluene sulfonic acid and acid salts such as calcium chloride. A preferred acid catalyst is hydrochloric acid. Basic catalysts commonly used are the hydroxides of the alkali and alkaline earth metals such as sodium hydroxide, potassium hydroxide and calcium hydroxide. Potassium hydroxide is a preferred basic catalyst.

The effectiveness of a catalyst is normally such that a very small amount is satisfactory to initiate the reaction. The quantity of acid or base catalyst which is used in the invented process can, nevertheless, be varied over quite a wide range and still be effective. The amount of catalyst used can range from 0.01 percent to about 30 percent based on the weight of the reactant phenol. The preferred amount of catalyst used is 0.01 percent to about 7 percent based on the weight of the reactant phenol.

According to the process of this invention, condensation of a phenol with a carbonyl compound can be accomplished over a very wide range of temperatures. The nature of the reaction system, that is, the physical state of the reactants at various temperatures, the type of reaction media employed, and other such factors, will have an influence on determining the most desirable temperature to use. The presence of the sulfoxide promoter will allow the process to be carried out efficiently, at a temperature lower than would be required if the sulfoxide were not present. Thus, the process of this invention can be conducted at temperatures ranging from 50° C. to 250° C. The preferred temperature range is 50° C. to about 180° C.

Depending on the temperatures used and the nature of the reaction system, the process may be conducted under widely varying pressure conditions. The pressure is not critical. Thus, if a highly volatile reaction ingredient is present and comparatively high temperatures are employed, pressures above atmospheric may be used to keep the volatile ingredient in a non-vaporous state. The process can be carried out under reduced pressure, if required. The reaction will proceed with equal facility at normal atmospheric pressure.

The nature of the reaction system, the temperature used, and other factors such as percent yield desired, contamination level of the product, and degree of unwanted side reactions, will be taken into consideration when setting the reaction time. Use of the sulfoxide to promote the reaction shortens the reaction time which would be required to produce a like amount of alkylidene bis-phenol, were sulfoxide not present. Thus, if a particular condensation reaction requires eight hours to yield 10 percent of an alkylidene bisphenol where sulfoxide is not present, with the sulfoxide added, the same reaction under the same conditions would proceed to a 10 percent yield in considerably less than eight hours. On the other hand, if the practitioner chose, he might allow the reaction to proceed in the presence of the sulfoxide promoter for more than one hour in order to obtain a yield of alkylidene bisphenol heretofore unobtainable. So, the reaction may be allowed to proceed for as long a time as is required by the practitioner of the process. Normally, a reaction period of from 1 to about 48 hours will be sufficient. More commonly, reaction periods of from 4 to about 24 hours are satisfactory.

The reaction may be carried out in air although an inert atmosphere such as nitrogen is preferred.

In order to more fully illustrate the improvement in reaction rate effected by this invention, the two following examples were carried out. The reactants were the same except that Example 1 was conducted using a conventional procedure without sulfoxide while Example 2 was conducted using dimethyl sulfoxide as a promoter. All parts and percentages in all the examples to follow are by weight unless otherwise indicated.

EXAMPLE 1

To a reaction vessel provided with a stirrer, thermometer and a condenser was added 103 parts of 2,6-di-tert-butyl phenol, 40 parts of acetone, 5 parts of 45 percent aqueous potassium hydroxide and 200 parts of methanol under a nitrogen flush. The stirred reaction mass was heated to reflux and kept there for six days. At the end of this time, the reaction mass was cooled to room temperature. Five parts of concentrated HCl were added and the reaction mass was then cooled to 5° C. The solid which separated was then filtered off. Infrared analysis showed it to be 4,4'-isopropylidene bis(2,6-di-tert-butyl) phenol. The yield was 32 percent.

EXAMPLE 2

To a reaction vessel as equipped in Example 1 was added 103 parts of 2,6-di-tert-butyl phenol, 40 parts of acetone, 5 parts of 45 percent aqueous potassium hydroxide and 250 parts of dimethyl sulfoxide under a nitrogen flush. The stirred reaction mass was heated to 110° C. and held there for 24 hours. The reaction mass was then cooled to 12° C. and neutralized with concentrated hydrochloric acid. Water was then added to the reaction mixture and the mass allowed to remain at 12° C. with stirring. After five minutes a solid separated. This solid was filtered off, washed with water and then recrystallized from hexane. The product was identified by infrared analysis as 4,4'-isopropylidene bis(2,6-di-tert-butylphenol). The yield was 50.5 percent.

Where the reaction was carried out without any sulfoxide present (Example 1), six days were required in order to obtain a 32 percent yield of the alkylidene bis-phenol product. Where the sulfoxide was present (Example 2), the yield of the alkylidene bisphenol product was increased to 50.5 percent and the reaction time was reduced to one day. These results illustrate the significant improvement in the yield and reduction in the reaction time accomplished in using the process of this invention.

The following examples further illustrate the manner in which this invention is carried out.

EXAMPLE 3

A reaction vessel equipped with a thermometer, a stirrer, and a reflux condenser is charged with 75 parts of 2-methyl-6-isopropylphenol, 72 parts of methyl ethyl ketone, 5 parts of 45 percent aqueous potassium hydroxide and 300 parts of dimethyl sulfoxide. The mixture is heated, with stirring to 150° C. and kept there for 20 hours. The mixture is then cooled to room temperature. Water is added and the mixture is further cooled to about 10° C. The product which is isolated therefrom in good yield is 4,4'(1-methylpropylidene)-bis(2-methyl-6-isopropylphenol).

Following is a list of phenols which then used in place of the phenol described in Example 3 yield bisphenol products listed on the right. The amount of phenol charged in each case is the molar equivalent of the amount used in Example 3.

| Phenol | Bis-Phenol Product |
| --- | --- |
| 2-n-hexyl-6-(1,1,2,2-tetra-methyl-n-propyl)phenol. | 4,4'-(1-methylpropylidene)-bis-[2-n-hexyl 6-(1,1,2,2-tetramethyl-n-propylphenol]. |
| 2-n-dodecyl-6-(1,1,3,3-tetra-methyl-n-octyl)phenol. | 4-4'-(methylpropylidene)bis-[2-n-dodecyl-6-(1,1,3,3-tetramethyl-n-octyl)phenol]. |
| 2-isobutyl-6-n-octylphenol | 4,4'-(1-methylpropylidene)-bis-(2-isobutyl-6-n-octylphenol). |
| 2-bromo-6-isopropylphenol | 4,4'-(1-methylpropylidene)-bis-(2-bromo-6-isopropylphenol). |
| 2-n-hexyl-4-(1,1,2,2-tetra-methyl-n-propyl)phenol. | 6,6'-(1-methylpropylidene)-bis-[2 n-hexyl-4-(1,1,2,2-tetramethyl-n-propyl)phenol]. |
| 2-(1,1,3,3-tetramethyl-n-octyl)-4-n-dodecylphenol. | 6,6'-(1-methylpropylidene)-bis-[2-(1,1,3,3-tetramethyl-n-octyl)-4-n-dodecylphenol]. |
| 2-isobutyl-4-n-octylphenol | 6,6'-(1-methylpropylidene)-bis-(2-isobutyl-4-n-octylphenol). |
| 2-methyl-4-isopropylphenol | 6,6'-(1-methylpropylidene)-bis-(2-methyl-4-isopropylphenol). |
| 2-tert-butylphenol | 4,4'-(1-methylpropylidene)-bis-(2-tert-butylphenol). |
| | 4,6'-(1-methylpropylidene)-bis-(2-tert-butylphenol). |
| | 6,6'-(1-methylpropylidene)-bis-(2-tert-butylphenol). |
| 2-n-butyl-6-(4-ethylphenyl)-phenol. | 4,4'-(1-methylpropylidene)-bis-[2-n-butyl-6-(4-ethylphenyl)phenol] |

EXAMPLE 4

To a reaction vessel equipped as in Example 3, are added 452 parts of 2-isopropyl-6-benzylphenol, 120 parts of acetophenone, 5 parts of 36 percent hydrochloric acid, and 800 parts of dimethylsulfoxide. The mixture is heated to 120° C. with stirring. It is kept there for 4 hours. At the end of this time, the reaction mixture is cooled to room temperature. Water is added and the mixture is cooled down to about 5° C. A superior yield of the product 4,4'-(α-methylbenzylidene)-bis-(2-isopropyl-6-benzylphenol) is therefrom recovered.

Following is a list of bisphenol products which are obtained when the phenols listed on the left are used in place of the 2-isopropyl-6-benzylphenol in Example 4. The amount of phenol used is the molar equivalent of the amount of 2-isopropyl-6-benzylphenol used.

| Phenol | Bis-Phenol Product |
| --- | --- |
| 2-(α,α-dimethylbenzyl)-6-(1,1,2,2-tetramethyl-n-propyl)phenol. | 4,4'-(α-methylbenzylidene)-bis-[2-(α,α-dimethylbenzyl)-6-(1,1,2,2-tetramethyl-n-propyl)phenol]. |
| 2-(6-phenyl-n-hexyl)-6-(1-methyl-n-undecyl)phenol. | 4,4'-(α-methylbenzylidene)-bis-[2-(6-phenyl-n-hexyl)-6-(1-methyl-n-undecyl)phenol]. |
| 2-isobutyl-6-(α-methylbenzyl)phenol. | 4,4'-(α-methylbenzylidene)-bis-[2-isobutyl-6-(A-methylbenzyl)phenol]. |
| 2-isopropyl-4-benzylphenol | 6,6'-(α-methylbenzylidene)-bis-(2-isopropyl-4-benzylphenol). |
| 2-isopropylphenol | 4,4'-(α-methylbenzylidene)-bis-(2-isopropylphenol). |
| | 4,6'-(α-methylbenzylidene)-bis-(2-isopropylphenol). |
| | 6,6'-(α-methylbenzylidene)-bis-(2-isopropylphenol). |
| 2-(α,α-dimethylbenzyl)-4-(1,1,2,2-tetramethyl-n-propyl)phenol. | 6,6'-(α-methylbenzylidene)-bis-[2-(α,α-dimethylbenzyl)-4-(1,1,2,2-tetramethyl-n-propyl)phenol]. |
| 2-(6-phenyl-n-hexyl)-4-(1-methyl-n-undecyl)phenol. | 6,6'-(α-methylbenzylidene)-bis-[2-(6-phenyl-n-hexyl)-4-(1-methyl-n-undecyl)phenol]. |

EXAMPLE 5

A reaction vessel equipped as in Example 3 is charged with 552 parts of 2-methyl-6-phenylphenol, 148 parts of methyl cyclohexyl ketone, 1200 parts of dimethylsulfoxide and 3 parts of 50 percent sulfuric acid. The mixture is heated with stirring, to 70° C. and kept there for 40 hours. The mixture is then cooled to room temperature. After water is added, the mixture is stirred and cooled down to about 15° C. A good yield of 4,4'-(1-cyclohexylethylidene)-bis-(2-methyl-6-phenylphenol) is isolated therefrom.

Listed below are phenols and the bisphenol products which are obtained when these phenols are used in place of 2-methyl-6-phenylphenol in Example 5. In each case, the amount of phenol used is the molar equivalent of the 2-methyl-6-phenylphenol used.

| Phenol | Bis-Phenol-Product |
| --- | --- |
| 2-n-dodecyl-6-(4-biphenylyl)phenol. | 4,4'-(1-cyclohexylethylidene)-bis-[2-n-dodecyl-6-(4-biphenylyl)phenol]. |
| 2-n-dodecyl-6-(β-naphthyl) phenol. | 4,4'-(1-cyclohexylethylidene)-bis-[2-n-dodecyl-6-(β-naphthyl)phenol]. |
| 2-(3-biphenylyl)-6-n-hexylphenol. | 4,4'-(1-cyclohexylethylidene)-bis-[2-(3-biphenylyl)-6-n-hexyl)phenol]. |
| 2-ethylphenol | 4,4'-(1-cyclohexylethylidene)-bis-(2-ethylphenol). |
| | 4,6'-(1-cyclohexylethylidene)-bis-(2-ethylphenol); |
| | 6,6'-(1-cyclohexylethylidene)-bis-(2-ethylphenol). |
| 2-methyl-4-phenylphenol | 6,6'-(1-cyclohexylethylidene)-bis-(2-methyl-4-phenylphenol). |
| 2-n-decyl-4-(α-naphthyl)phenol. | 6,6'-(1-cyclohexylethylidene)-bis-[2-n-decyl-4-(α-naphthyl)phenol]. |
| 2,4-diphenylphenol | 6,6'-(1-cyclohexylethylidene)-bis-(2,4-diphenylphenol). |
| 2-n-propyl-4-(2-n-pentylphenyl)phenol. | 6,6'-(1-cyclohexylethylidene)-bis-[2-n-propyl-4-(2-n-pentylphenyl)phenol]. |

EXAMPLE 6

To a reaction vessel as equipped in Example 3, are added 172 parts of 2-(6-phenyl-n-hexyl)-6-benzylphenol, 500 parts of methyl tert-butyl ketone, 6 parts of 40 percent aqueous NaOH, and 300 parts of dimethyl sulfoxide. The mixture is stirred and heated to 50° C., where it is kept for 48 hours. The mixture is then cooled to room temperature and water is added. The mass is then cooled further to about 10° C. The product which is recovered therefrom in superior yield is 4,4'-(1,2,2-trimethylpropylidene)-bis-[2-(6-phenyl-n-hexyl)-6-benzylphenol].

Some other phenols which are used in place of the phenol described in Example 4 and the products which are obtained are listed below. The amount of phenol used is the molar equivalent of the amount of 2-(6-phenyl-n-hexyl)-6-benzylphenol specified.

| Phenol | Bis-Phenol Product |
| --- | --- |
| 2-sec-butylphenol | 4,4'-(1,2,2-trimethylpropylidene)-bis-(2-sec-butylphenol). |
| | 4,6'-(1,2,2-trimethylpropylidene)-bis-(2-sec-butylphenol). |
| | 6,6'-(1,2,2-trimethylpropylidene)-bis-(2-sec-butylphenol). |
| 2-benzyl-6-(α,α-dimethylbenzyl)phenol. | 4,4'(1,2,2-trimethylpropylidene)-bis-[2-benzyl-6-(α,α-dimethylbenzyl)phenol]. |
| 2,6-diphenethylphenol | 4,4'-(1,2,2-trimethylpropylidene)-bis-(2,6-diphenethylphenol). |
| 2,4-diphenethylphenol | 6,6'-(1,2,2-trimethylpropylidene)-bis-(2,4-diphenethylphenol). |
| 2-(α,α-dimethylbenzyl)-4-(5-phenyl-n-pentyl)phenol. | 6,6'-(1,2,2-trimethylpropylidene)-bis-[2-(α,α-dimethylbenzyl)-4-(5-phenyl-n-pentyl)phenol]. |
| 2,6-di-p-tolylphenol | 4,4'-(1,2,2-trimethylpropylidene)-bis-(2,6-di-p-tolylphenol). |

EXAMPLE 7

A reaction vessel equipped as in Example 3 is charged with 192 parts of 2-methyl-6-n-hexylphenol, 162 parts of methyl-n-pentyl ketone, 5 parts of 36 percent hydrochloric acid and 400 parts of dimethyl sulfoxide. The mixture is heated to 180° C. with stirring and kept there for 16 hours. The mixture is then cooled to room temperature and water is added. The mass is stirred and cooled further to about 10° C. The product which is recovered therefrom in good yield is 4,4′ - (1 - methylhexylidene)-bis-(2-methyl-6-n-hexylphenol).

Following is a list of phenols which, when used in place of the phenol described in Example 7, yield bisphenol products listed on the right. The quantity of phenol used in each case is the molar equivalent of the amount of 2-methyl-6-n-hexylphenol used in the example above.

| Phenol | Bis-Phenol Product |
| --- | --- |
| 2-methyl-6-n-dodecylphenol | 4,4′-(1-methylhexylidene)-bis-(2-methyl-6-n-dodecylphenol). |
| 2-ethyl-6-n-decylphenol | 4,4′-(1-methylhexylidene)-bis-(2-ethyl-6-n-decylphenol). |
| 2-methyl-6-chlorophenol | 4,4′-(1-methylhexylidene)-bis-(2-methyl-6-chlorophenol). |
| 2,6-di-n-heptylphenol | 4,4′-(1-methylhexylidene)-bis-(2,6-di-n-heptylphenol). |
| 2-n-propyl-6-n-dodecylphenol | 4,4′-(1-methylhexylidene)-bis-(2-n-proply-6-n-dodecylphenol). |
| 2-n-heptyl-4-n-undecylphenol | 6,6′-(1-methylhexylidene)-bis-(2-n-heptyl-4-n-undecylphenol). |
| 2-n-hexyl-4-methylphenol | 6,6′-(1-methylhexylidene)-bis-(2-n-hexyl-4-methylphenol). |
| 2-isopropyl-4-(2-n-butylphenyl) | 6,6′-(1-methylhexylidene)-bis-[2-isopropyl-4-(2-n-butylphenyl)phenol]. |

EXAMPLE 8

A reaction vessel as equipped in Example 3 is charged with 356 parts of 2-ethyl-6-isobutylphenol, 182 parts of benzophenone, 450 parts of dimethyl sulfoxide and 5 parts of 50 percent sulfuric acid. The mixture is heated to 100° C. and stirred for 28 hours. The mixture is then cooled to room temperature. Water is added. The mass is then stirred and cooled further to about 15° C. The product, 4,4′ - (diphenylmethylene)-bis-(2-ethyl-6-isobutylphenol) is isolated therefrom in excellent yield.

Listed below are other carbonyl compounds and the bisphenol products obtained when these carbonyl compounds are used in place of the benzophenone in Example 8. In each case, the amount of carbonyl compound used is the molar equivalent of the amount of benzophenone shown.

| Carbonyl Compound | Bis-Phenol Product |
| --- | --- |
| n-Butyl-methyl ketone | 4,4′-(1-methylpentylidene)-bis-(2-ethyl-6-isobutylphenol). |
| n-Hexyl-(4-biphenylyl) ketone | 4,4′-[1-(4-biphenylyl)heptylidene]-bis-(2-ethyl-6-isobutylphenol). |
| β-Naphthyl-n-nonyl ketone | 4,4′-[1-(β-naphthyl)decylidene]-bis-(2-ethyl-6-isobutylphenol). |
| Heptanal | 4,4′-heptylidene-bis-(2-ethyl-6-isobutylphenol). |
| Benzaldehyde | 4,4′-benzylidene-bis-(2-ethyl-6-isobutylphenol). |

EXAMPLE 9

To the reaction vessel as equipped in Example 3 are added 450 parts of 2-n-hexyl-6-(α-methylbenzyl)phenol, 204 parts of benzyl-n-hexyl ketone, 5 parts of 45 percent aqueous potassium hydroxide, 180 parts of dimethyl sulfoxide, and 220 parts of dimethyl carbitol. The mixture is stirred, heated to 160° C. and kept there for 1 hour. Then, this mixture is cooled to room temperature and water is added. The mass is stirred and cooled further to about 10° C. The product which is recovered in good yield is 4,4′-(1-benzylheptylidene)-bis-[2-n-hexyl-6-(α-methylbenzyl)phenol].

Listed below are carbonyl compounds and the bisphenol products obtained when these carbonyl compounds are used in place of the benzyl-n-hexyl ketone in the example above. The amount of carbonyl compound used is the molar equivalent of the benzyl-n-hexyl ketone.

| Carbonyl Compound | Bis-Phenol Product |
| --- | --- |
| Methyl-(3-phenyl-n-propyl) ketone. | 4,4′-(1-methyl-4-phenylbutylidene)-bis-[2-n-hexyl-6-(α-methylbenzyl)phenol]. |
| n-Dodecyl-(6-phenyl-n-hexyl) ketone. | 4,4′-[1-(6-phenyl-n-hexyl)tridecylidene]-bis-[2-n-hexyl-6-(α-methylbenzyl)phenol]. |
| n-Pentyl phenethyl ketone | 4,4′-(1-phenethylhexylidene)-bis-[2-n-hexyl-6-(α-methylbenzyl)phenol]. |
| Phenyl acetaldehyde | 4,4′-(2-phenylethylidene)-bis-[2-n-hexyl-6-(α-methylbenzyl)phenol]. |

EXAMPLE 10

A reaction vessel equipped as in Example 3 is charged with 268 parts of 2-isobutyl-6-(α,α-dimethyl benzyl)phenol, 128 parts of methyl-n-hexyl ketone, 4 parts of 36 percent hydrochloric acid, and 440 parts of dimethyl sulfoxide. The mixture is stirred, heated to 90° C. and held there for 34 hours. The mixture is then cooled to room temperature, water is added, and the mixture is cooled further to about 10° C. An excellent yield of the product 4,4′-(1-methylheptylidene)-bis-[2-isobutyl-6-(α,α-dimethylbenzyl)phenol], is recovered therefrom.

Listed below are other carbonyl compounds which are used in place of the methyl-n-hexyl ketone in the above example. The bisphenol products which are obtained are listed also. The amount of carbonyl compound used is the molar equivalent of the amount of the ketone described in Example 10.

| Carbonyl Compound | Bis-Phenol Product |
| --- | --- |
| n-Hexyl-n-decyl ketone | 4,4′-(1-hexylundecylidene)-bis-[2-isobutyl-6-(α,α-dimethylbenzyl) phenol]. |
| Butanal | 4,4′-butylidene-bis-[2-isobutyl-6-(α,α-dimethylbenzyl) phenol]. |
| Levulinic acid | 4,4′-(1-methyl-3-carboxypropylidene)-bis-[2-isobutyl-6-(α,α-dimethylbenzyl) phenol]. |
| Formaldehyde | 4,4′-methylene-bis-[2-isobutyl-6-(α,α-dimethylbenzyl) phenol]. |
| Diisobutyl ketone | 4,4′-(1-isobutyl-3-methylbutylidene)-bis-[2-isobutyl-6-(α,α-dimethylbenzyl) phenol]. |
| Ethyl (2-ethyl-n-hexyl) ketone | 4,4′-(1,3-diethylheptylidene)-bis-[2-isobutyl-6-(α,α-dimethylbenzyl) phenol]. |

EXAMPLE 11

A reaction vessel as equipped in Example 3 is charged with 262 parts of 2-n-octyl-6-isobutylphenol, 171 parts of diisopropyl ketone, 110 parts of diphenyl sulfoxide, 400 parts of isopropanol, and 5 parts of 45 percent potassium hydroxide. The mixture is stirred and heated to 70° C. It is held there for 32 hours. The mixture is then cooled to room temperature, water is added and the mass is cooled further to about 15° C. A good yield of the product, 4,4′-(1-isopropyl-2-methylpropylidene)-bis-(2-n-octyl-6-isobutylphenol), is recovered therefrom.

Example 11 is carried out as effectively when other sulfoxides are used in place of the diphenyl sulfoxide in the same quantity as in the example. Illustrative examples of other sulfoxides are phenyl-(4-biphenylyl) sulfoxide, α-naphthyl-(4-biphenylyl) sulfoxide, methyl phenyl sulfoxide, n-octyl-n-decyl sulfoxide, di-n-butyl sulfoxide.

EXAMPLE 12

To a reaction vessel equipped as in Example 3 are added 536 parts of 2-n-pentyl-6-(α-methylbenzyl)phenol, 208 parts of n-nonyl phenyl ketone, 5 parts of 36 percent hydrochloric acid, 300 parts of diethyl sulfoxide, and 700 parts of isopropanol. The mixture is heated with stirring to 130° C. and held there for 28 hours. This mixture is cooled to room temperature. Water is added with stirring. The mixture is then further cooled to about 15° C. The product which is recovered in high yield is 4,4'-(1-phenyl-decylidene) - bis - [2 - n - pentyl - 6 - (α - methylbenzyl) phenol].

Following are other sulfoxides which can be used as described in Example 12: isobutyl-n-octyl sulfoxide; methyl-n-octyl sulfoxide; methyl-n-butyl sulfoxide; di-n-butyl sulfoxide; methylethyl sulfoxide; isopropyl-n-octyl sulfoxide and di-n-heptyl sulfoxide.

EXAMPLE 13

To a reaction vessel equipped as in Example 3 are added 176 parts of o-cyclohexylphenol, 147 parts of cyclohexanone, 5 parts of 45 percent potassium hydroxide and 280 parts of dimethyl sulfoxide. The mixture is heated with stirring to 145° C. and held there for 22 hours. This mixture is then cooled to room temperature and water is added. The mixture is stirred and further cooled to about 10° C. The product, 4,4'-cyclohexylidene-bis-(2-cyclohexylphenol), is isolated therefrom.

The types of sulfoxides described in Examples 11 and 12 may be used in place of any sulfoxide in any of the Examples 1 through 13 above without affecting efficiency of the invented process.

Reaction media such as isopropanol or dimethyl carbitol may also be used in the systems described in Examples 1 through 13, if desired; the presence or absence of such diluents does not limit the effectiveness of the invented process.

It is not always necessary to isolate the alkylidene bisphenols obtained in this process. For example, when the bisphenol is to be used as an intermediate in preparing another compound, the reaction mixture containing the bisphenol product can be used directly. When isolation of the alkylidene bisphenol from a reaction mixture is required, then it is to be understood that any of the accepted methods effecting the recovery may be used, as for example, by distillation, crystallization or chromatographic separation.

The products of this process, the alkylidene bisphenols are widely used as antioxidants and stabilizers in lubricants, elastomers such as natural rubber, polybutadiene, ethylene propylene terpolymer; thermoplastic resins such as polyethylene, polypropylene and polyvinyl chloride; and in plasticizers such as dioctyl phthalate, diisodecyl phthalate and dicresyl phthalate. In addition, these alkylidene bisphenols are useful as intermediates in the manufacture of resins such as epoxy resins and polyester resins.

I claim:

1. A process for the production of alkylidene bisphenols, said process comprising reacting (a) a phenol having the formula

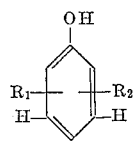

with (b) a carbonyl compound having the formula

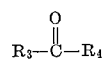

wherein $R_1$, $R_2$, $R_3$ and $R_4$ are independently selected from the group consisting of hydrogen, alkyl radicals containing 1–12 carbon atoms, aryl radicals containing 6–12 carbon atoms, aralkyl radicals containing 7–12 carbon atoms and alkaryl radicals containing 7–12 carbon atoms, in the presence of a sulfoxide having the formula

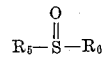

wherein $R_5$ and $R_6$ are independently selected from the group consisting of alkyl radicals containing 1–8 carbon atoms and aryl radicals containing 6–12 carbon atoms, within a temperature range of 50° to 250° C.

2. The process of claim 1 wherein $R_5$ and $R_6$ are alkyl radicals containing 1–8 carbon atoms.

3. The process of claim 1 wherein $R_5$ and $R_6$ are methyl radicals.

4. The process of claim 1 wherein $R_3$ and $R_4$ are alkyl radicals containing 1–12 carbon atoms.

5. The process of claim 4 wherein $R_1$ and $R_2$ are selected from the group consisting of hydrogen, alkyl radicals containing 1–12 carbon atoms and aralkyl radicals containing 7–12 carbon atoms.

6. The process of claim 4 wherein $R_1$ and $R_2$ are selected from the group consisting of hydrogen and alkyl radicals containing 1–12 carbon atoms.

7. A process for the production of alkylidene bisphenols, said process comprising reacting a phenol having the formula

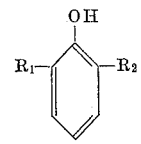

wherein $R_1$ is an α-branched alkyl radical containing 3–12 carbon atoms and $R_2$ is an alkyl radical containing 1–12 carbon atoms, with a carbonyl compound having the formula

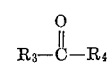

wherein $R_3$ and $R_4$ are alkyl radicals containing 1–12 carbon atoms, in the presence of a sulfoxide having the formula:

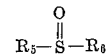

wherein $R_5$ and $R_6$ are independently selected from the group consisting of alkyl radicals containing 1–8 carbon atoms and aryl radicals containing 6–12 carbon atoms, within a temperature range of 50° to 250° C.

8. The process of claim 7 wherein $R_5$ and $R_6$ are alkyl radicals containing 1–8 carbon atoms.

9. The process of claim 8 wherein $R_1$ and $R_2$ are tert-butyl radicals.

10. The process of claim 9 wherein $R_3$ and $R_4$ are methyl radicals.

11. The process of claim 10 wherein $R_5$ and $R_6$ are methyl radicals.

References Cited

UNITED STATES PATENTS 2,359,242  9/1944  Perkins et al. _____ 260—619

BERNARD HELFIN, *Acting Primary Examiner.*

H. ROBERTS, *Assistant Examiner.*